(12) United States Patent
Fuss

(10) Patent No.: US 6,358,637 B1
(45) Date of Patent: Mar. 19, 2002

(54) FREEZE-PROTECTING A FUEL CELL BY VACUUM DRYING

(75) Inventor: Robert Lee Fuss, Spencerport, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/459,591

(22) Filed: Dec. 13, 1999

(51) Int. Cl.[7] ................................................ H01M 8/10
(52) U.S. Cl. ............................................. 429/12; 429/30
(58) Field of Search .............................. 429/12, 13, 30, 429/34

(56) References Cited

U.S. PATENT DOCUMENTS

| 4,087,976 A | * | 5/1978 | Morrow et al. ........... 429/17 X |
| 4,990,412 A | * | 2/1991 | Hersey ..................... 429/12 X |
| 5,432,020 A | * | 7/1995 | Fleek .......................... 429/13 |
| 5,753,383 A | * | 5/1998 | Cargnelli et al. ............. 429/13 |

OTHER PUBLICATIONS

Internet Page From NASA, "Apollo 13" http://nssdc.gsfc-.nasa.gov/planetary/lunar/apollo13info.html, Unknown.*

* cited by examiner

*Primary Examiner*—Stephen Kalafut
(74) *Attorney, Agent, or Firm*—Lawrence B. Plant; Cary W. Brooks

(57) ABSTRACT

A PEM fuel cell is vacuum-dried before storing under freezing conditions.

4 Claims, 1 Drawing Sheet

FREEZE-PROTECTING A FUEL CELL BY VACUUM DRYING

TECHNICAL FIELD

This invention relates to PEM/SPE fuel cells and more particularly to a method of conditioning such fuel cells for inactivity (e.g. storage) at subfreezing conditions.

BACKGROUND OF THE INVENTION

Fuel cells have been proposed as a power source for many applications. So-called PEM (proton exchange membrane) fuel cells [a.k.a. SPE (solid polymer electrolyte) fuel cells] potentially have high energy and low weight, and accordingly are desirable for mobile applications (e.g. electric vehicles). PEM/SPE fuel cells include a "membrane electrode assembly" (a.k.a. MEA) comprising a thin proton-transmissive, solid-polymer membrane-electrolyte having an anode on one of its faces and a cathode on the opposite face. The MEA is sandwiched between a pair of electrically conductive elements that serve as current collectors for the anode and cathode and contain channels/grooves therein forming a so-called "flow field" on the faces thereof for distributing the fuel cell's gaseous reactants over the surfaces of the respective anode and cathode.

PEM/SPE fuel cells are typically $H_2$—$O_2$ fuel cells wherein hydrogen is the anode reactant (i.e. fuel), and oxygen is the cathode reactant (i.e. oxidant). The oxygen can be either in a pure form or diluted with nitrogen (e.g. air), and the hydrogen can either be in a pure form or derived from the reformation of methanol, gasoline or the like. The solid polymer membranes are typically made from ion exchange resins such as perfluoronated sulfonic acid. One such resin is NAFION™ sold by the DuPont Company. Such membranes are well known in the art and are described in U.S. Pat. No. 5,272,017 and 3,134,697 as well as in the Journal of Power sources, Vol. 29, (1990), pages 367–387, inter alia. The anode and cathode typically comprise finely divided catalytic particles either alone or supported on the internal and external surfaces of carbon particles and have proton conductive resin intermingled therewith.

Commercially available solid polymer membranes all require some degree of humidification to be effective. Hence a humidifier is typically provided somewhere in the in the fuel cell system to supply moisture to the cells. Moreover, the current-producing fuel cell reaction (i.e. $H_2+O_2 \rightarrow H_2O$) forms water in situ within the cell during normal operation thereof. If allowed to freeze, the water in the cells forms ice which (1) can plug the flow channels and prevent any reactant gas from passing therethrough, (2) can damage the polymer membrane, and (3) can exert deleterious pressures within the cell(s) resulting from the expansion of the water during freezing. As long as the fuel cell is operating (i.e. producing current) or is otherwise heated, ice formation is not a problem. However during shut down, storage, or other inactivity of the fuel cell under freezing conditions damaging ice can form.

The present invention overcomes the problem associated with ice formation in inactive/unheated fuel cells that are subjected to freezing conditions.

SUMMARY OF THE INVENTION

The present invention contemplates a method of conditioning a PEM/SPE fuel preparatory to its being rendered inactive at subfreezing conditions. More specifically, the present invention contemplates substantially dehydrating the fuel cell before it can freeze by evacuating the flow field(s) of the fuel cell(s) with a vacuum that is sufficient to evaporate and remove enough water from the fuel cell(s) as to prevent damage thereto due to freezing. Preferably, evacuation of the fuel cell occurs when the cell stack has a temperature of at least about 20° C. In this regard, the water is more easily evaporated with a lesser vacuum from a warm fuel cell than from a cooler one. Most preferably, the fuel cell stack is normally operated at an elevated temperature (e.g. about 80° C.), and is evacuated to remove the water shortly after it is shut down and still warm (i.e. at least about 50° C.) from its operation.

BRIEF DESCRIPTION OF THE DRAWINGS

The invention will better be understood when considered in the light of the following description thereof which is given in conjunction with the several drawings of which.

DESCRIPTION OF THE PREFERRED EMBODIMENT

Figure 1:
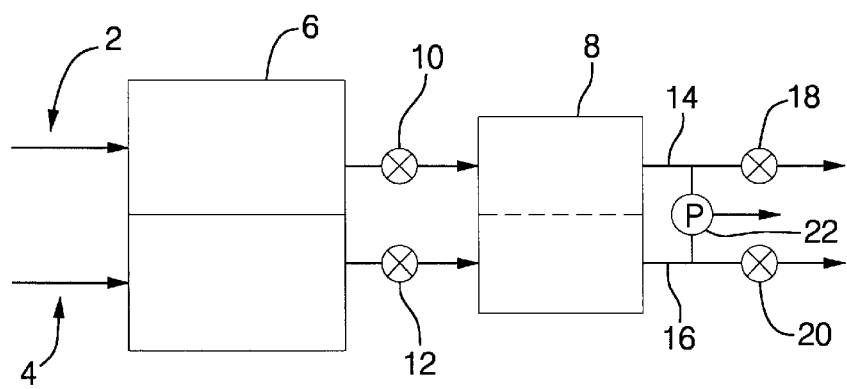
FIG. 1 is a simplified schematic depicting the invention.
Figure 2:
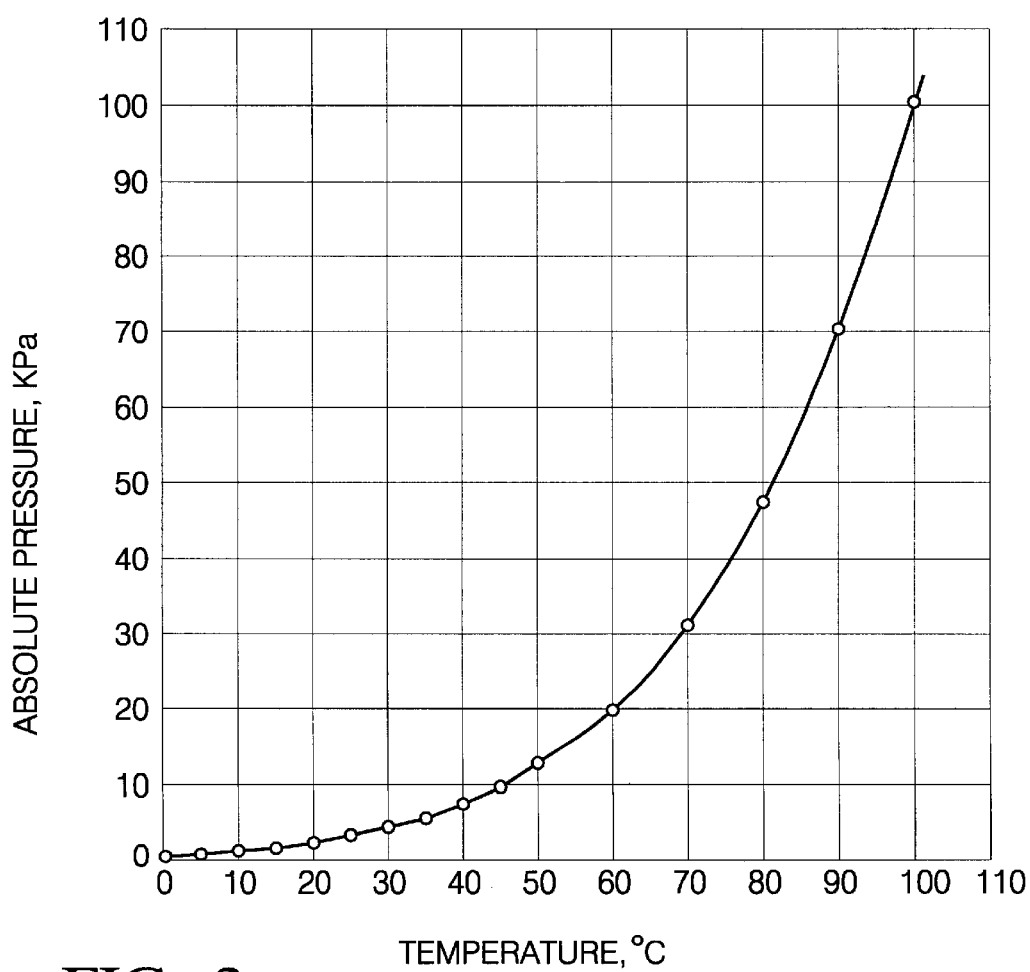
FIG. 2 is a curve of the boiling points of water at various subatmospheric pressures (i.e. vacuums).

The present invention contemplates protecting a PEM/SPE fuel cell against damage due to freezing by applying a sufficient vacuum to the flow field of the fuel cell to substantially dehydrate the fuel cell before the temperature of the fuel cell drops below freezing. To this end a vacuum pump is connected to the anode and cathode supply or exhaust conduits leading to or from the fuel cell. FIG. 1 depicts one embodiment of the invention wherein a hydrogen fuel stream 2 and an oxygen (e.g. air) oxidant stream 4 are humidified in humidifier 6 from which they pass into fuel cell 8 via shut off valves 10 and 12. Anode and cathode effluent streams 14 and 16 respectively exit the fuel cell and pass through shut off valves 18 and 20. After the fuel cell has been deactivated, the valves 10, 12, 18 and 20 are closed to isolate the fuel cell from the rest of the system. Thereafter a vacuum pump 22, that communicates with the streams 14 and 16, is energized to vaporize any free water (i.e. not contained within the membrane) left in the fuel cell. The vacuum pump is energized at any time after the fuel cell has been shut down, and before the fuel cell's temperature drops into the freezing zone (i.e. below 0° C. @ one atmosphere pressure). In the case of a fuel cell powered electric vehicle, the vacuum pump could either be an onboard pump carried by the electric vehicle (e.g. already on board for other uses), or a separate, stand alone, pump that is provided external to the vehicle (e.g. in a garage).

The intensity of the applied vacuum will vary depending on the temperature of the fuel cell at the time the vacuum is applied. At higher temperatures, lower vacuums can be used than at lower temperatures to effect the same amount of dehydration. Preferably, evacuation will occur at a temperature of at least about 20° C. In accordance with a most preferred embodiment of the invention, evacuation will occur shortly after the fuel cell is deactivated while the cell is still warm i.e. while the cell is at a temperature near its operating temperature or at least about 50° C. This is particularly advantageous for electric vehicle applications having an onboard vacuum pump(s) because the pump(s) can be smaller, lighter and consume less power than larger pump(s). Modern PEM/SPE fuel cells typically operate at about 80° C. At this temperature, vacuums of only about 47.4 kPa (abs) are needed to evaporate the free water from the fuel cell. At 50° C., about 12.35 kPa is required. At lower temperatures, higher vacuums are required. Hence for example, if the temperature of the fuel cell were only about 35° C. at the time the vacuum was applied, a vacuum of at least about 5.6 kPa (abs) would be required. This would require a much larger vacuum pump that consumes significantly more energy than the smaller pumps useful when evacuating at higher temperatures. Alternatively, the temperature of the fuel cell could be maintained or adjusted during evacuation by controlling the temperature of the coolant that normally flows through the fuel cell to extract heat therefrom during its normal operation.

Generally speaking, the minimum vacuum required to evaporate the water at a given temperature can be found by reference to FIG. 1 or any other psychometric table or chart showing the boiling point (i.e. temperature) of water at different subatmospheric pressures. In this regard FIG. 1 is a curve showing the boiling points (i.e. temperature in ° C.) of water at various subatmospheric (i.e. vacuum in kPa absolute) pressures.

EXAMPLES

A number of tests were conduced to evaluate the efficacy of vacuum dehydrating a fuel cell stack before freezing to prevent cell damage and facilitate cell startup from a freezing condition. To this end, a number of PEM fuel cell stacks, varying from 10 to 20 cells per stack and 500 $cm^2$ cell were operated at about 80° C. at various loads and humidity levels using both (1) pure $H_2$, and (2) CO-free, synthetic reformate (i.e. $65H_2/25CO_2/10N_2$). When normal operation of the stack was ended, the anode and cathode outlets were sealed, and the inlets connected to a vacuum pump and evacuated to a pressure below 3 kPa at 25° C. Some of the stacks were flushed/purged with dry nitrogen for one minute before applying the vacuum. Others were not. The stack was then cooled to sub-freezing temperatures that varied from about 0° C. to about −30° C., and allowed to stabilize thereat for several hours. To restart the cells after freezing, the reactant (i.e. air and $H_2$) lines were reconnected and dry reactants supplied at about 20° C. without humidification. No coolant was flowed through the stack until after the internal stack temperature was well above freezing.

In these tests, the current was drawn from the cell (i.e. the load) at three different rates. At the "standard" rate, an Initial load of 50 amps was drawn, and after all cells were stable at 0.600–0.650 volts each, the load was increased in 50 amp increments. At the "slow" rate, the initial load was 5 amps which was thereafter increased in 1 amp increments after all cells were stable at 0.550–0.600 volts each. At the "auto" rate, the load was increased as fast as possible while assuring that no individual cell in the stack dropped below 0.5 volts. The electrical load on the stack, and the reactant flow rates were increased until either (1) the stack's normal operating temperature was reached, or (2) a current density of 0.6 amps/$cm^2$ was reached. Performance, and hence success or failure, was measured by the lowest temperature at which a successful start-up was achieved. The results of those tests are shown in Table I.

TABLE I

| Temp | Load | $N_2$ Purge | Vacuum | Result | Fuel |
| --- | --- | --- | --- | --- | --- |
| −10° C. | Standard | No | No | Failure | Hydrogen |
| −10° C. | Standard | No | No | Failure | Hydrogen |
| +25° C. | Standard | Yes | Yes | Success | Hydrogen |
| +3° C. | Standard | Yes | Yes | Success | Hydrogen |
| 0° C. | Slow | Yes | Yes | Success | Hydrogen |
| −3° C. | Slow | Yes | Yes | Success | Hydrogen |
| −10° C. | Slow | Yes | Yea | Success | Hydrogen |
| −20° C. | Slow | Yes | Yes | Success | Hydrogen |
| −30° C. | Slow | Yes | Yes | Failure[1] | Hydrogen |
| −10° C. | Slow | No | No | Failure | Hydrogen |
| −5° C. | Slow | Yes | No | Success | Hydrogen |
| −10° C. | Slow | No | No | Failure | Hydrogen |
| −10° C. | Slow | Yes | No | Failure | Hydrogen |
| −10° C. | Slow | Yes | No | Success | Syn Reformate |
| −10° C. | Slow | Yes | No | Success | Syn Reformate |
| −10° C. | Auto | No | No | Failure | Syn Reformate |
| −10° C. | Auto | No | No | Failure | Syn Reformate |
| −20° C. | Auto | No | Yes | Success | Syn Reformate |
| −20° C. | Auto | No | Yes | Failure | Syn Reformate |
| −10° C. | Auto | No | Yes | Success | Syn Reformate |
| −20° C. | Auto | No | Yes | Success | Syn Reformate |
| −20° C. | Auto | No | Yes | Success | Syn Reformate |
| −20° C. | Auto | No | Yes | Success | Syn Reformate |
| −30° C. | Auto | No | Yes | Failure[1] | Syn Reformate |
| −10° C. | Auto | No | Yes | Success | Syn Reformate |
| −20° C. | Auto | No | Yes | Failure[1] | Syn Reformate |
| −20° C. | Auto | No | Yes | Success | Syn Reformate |
| −20° C. | Auto | No | Yes | Success | $H_2$ |
| −20° C. | Auto | No | Yes | Success | $H_2$ |

[1]failure was due to leaking seals in the stack.

While the invention has been described in terms of a specific embodiment thereof it is not intended to be limited thereto but rather only to the extent set forth hereafter in the claims which follow.

What is claimed is:

1. A method of conditioning a PEM/SPE fuel cell preparatory to its being maintained in an inactive state at freezing conditions comprising evacuating said fuel cell with a vacuum that is sufficient to substantially dehydrate said fuel cell before said fuel cell is subjected to said conditions, and subjecting said fuel cell to said conditions.

2. A method according to claim 1 wherein said drawing occurs when the fuel cell's temperature is at least about 20° C.

3. A method of preparing a PEM/SPE fuel cell for subsequent inactivity under freezing conditions comprising operating said fuel cell at a temperature above the freezing point of water, discontinuing said operating, and drawing a vacuum on said fuel cell before its temperature drops to or below said freezing point, said vacuum being sufficient to dehydrate said fuel cell.

4. A method according to claim 3 wherein said drawing occurs when the fuel cell's temperature is at least about 50° C.

* * * * *

UNITED STATES PATENT AND TRADEMARK OFFICE
CERTIFICATE OF CORRECTION

PATENT NO.   : 6,358,637 B1
DATED        : March 19, 2002
INVENTOR(S)  : Robert Lee Fuss It is certified that error appears in the above-identified patent and that said Letters Patent is hereby corrected as shown below:

Column 4,
Line 46, after "according to" the words "claim 1" should read -- claim 3 --.

Signed and Sealed this

Nineteenth Day of November, 2002

*Attest:*

*Attesting Officer*

JAMES E. ROGAN
*Director of the United States Patent and Trademark Office*